Dec. 9, 1952    M. D'ALIBERTI    2,621,157
SEPTIC TANK

Filed May 29, 1950    2 SHEETS—SHEET 1

INVENTOR.
Michael D'Aliberti

BY Lancaster, Allwine & Rommel
ATTORNEYS.

Patented Dec. 9, 1952

2,621,157

UNITED STATES PATENT OFFICE 2,621,157

SEPTIC TANK

Michael D'Aliberti, Troy Hills, N. J.

Application May 29, 1950, Serial No. 165,088

8 Claims. (Cl. 210—6)

This invention relates to septic tank construction.

Septic tanks as heretofore constructed have in general been formed as baffled containers adapted to be initially filled almost to capacity with water. In operation, waste material deposited in the tank is converted to sludge which gathers within the tank at the upper end thereof, in an ever increasing quantity. Ultimately, as the bottom level of the sludge drops lower within the tank by reason of the increase of the sludge mass, the sludge will find its way into the outlet baffle and moving upwardly therethrough, moves out of the outlet and plugs the entire drain system, placing the tank out of commission and requiring expensive and difficult cleaning out operations.

To forestall such an occurrence, it is a requirement that a septic tank as commonly constructed be continually pumped as well as cleaned out rather frequently.

It is an important object of the present invention, accordingly, to provide a septic tank that will have a sludge capacity increased materially above that of the ordinary tank, without, however, the attendant increase in overall size of the septic tank that would normally be expected if the sludge-handling capacity thereof is increased.

Another important object is the provision of a septic tank which will not require the constant pumping now necessary to the proper maintenance of septic tanks as commonly constructed.

Yet another object is to provide a septic tank construction specifically designed to permit cleaning at substantially greater intervals than is now the case.

Another important object is to provide a septic tank having an extra air space for acceleration of the bacterial action required for conversion of the raw wastes to sludge.

In carrying out the above objects, I provide a septic tank which, described briefly, includes a container having a removable cover plate; diametrically opposite inlet and outlet baffles that overlie inlet and outlet openings formed in the container; a sectional inner cover spaced from the cover plate to provide an air space, this inner cover having a depressed center portion extending diametrically thereacross; a pair of upstanding partitions below the inner cover and dividing the space below the inner cover into a pair of sludge chambers separated from a water chamber in which the bacterial action takes place, the water chamber communicating with the inlet and outlet openings for receiving material and converting it into sludge, so that the sludge will rise and be divided by said depressed center portion to fall into the two sludge chambers; and a transverse baffle within the water chamber to prevent raw material from flowing directly to the outlet.

With the foregoing and other objects in view which will appear as the description proceeds, the invention consists of certain novel details of construction and combinations of parts, hereinafter more fully described and pointed out in the claims, it being understood that changes may be made in construction and arrangement of parts without departing from the spirit of the invention as claimed.

Referring to the drawings.

Figure 1:
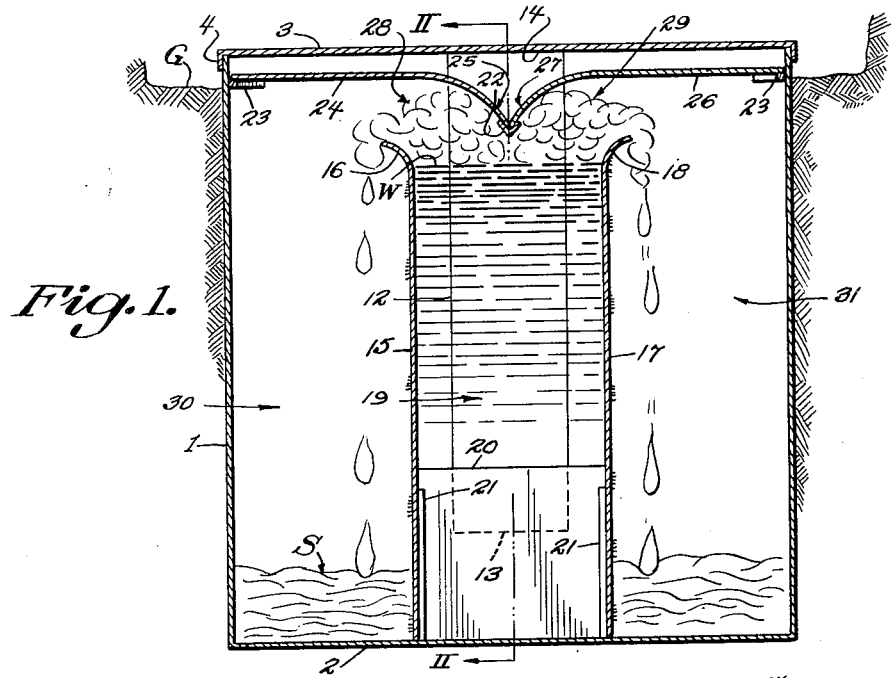
Figure 1 is a vertical sectional view taken substantially on line I—I of Figure 2, of a septic tank formed in accordance with the invention.
Figure 2:
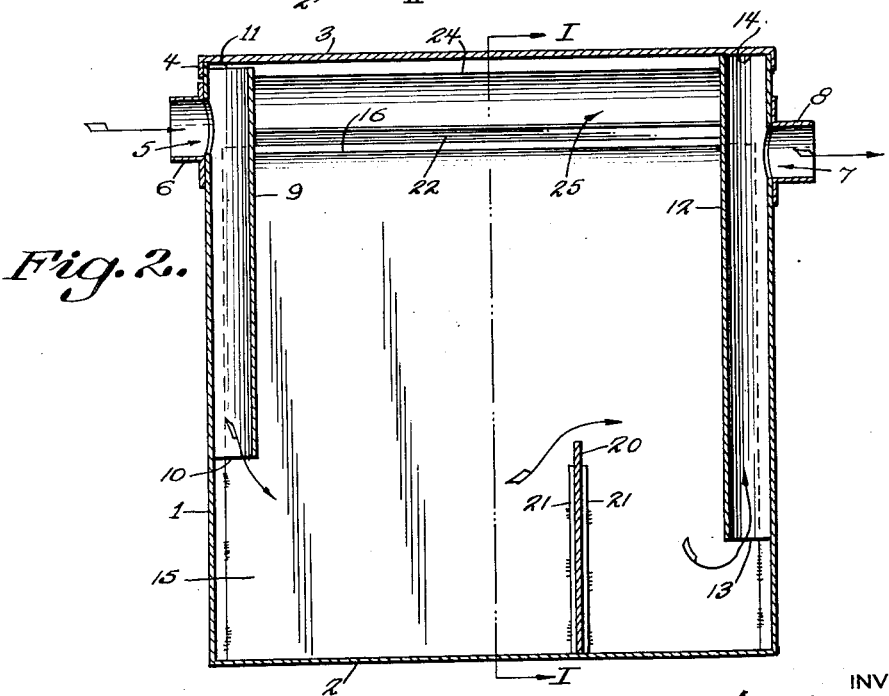
Figure 2 is a vertical sectional view taken on line II—II of Figure 1.
Figure 3:
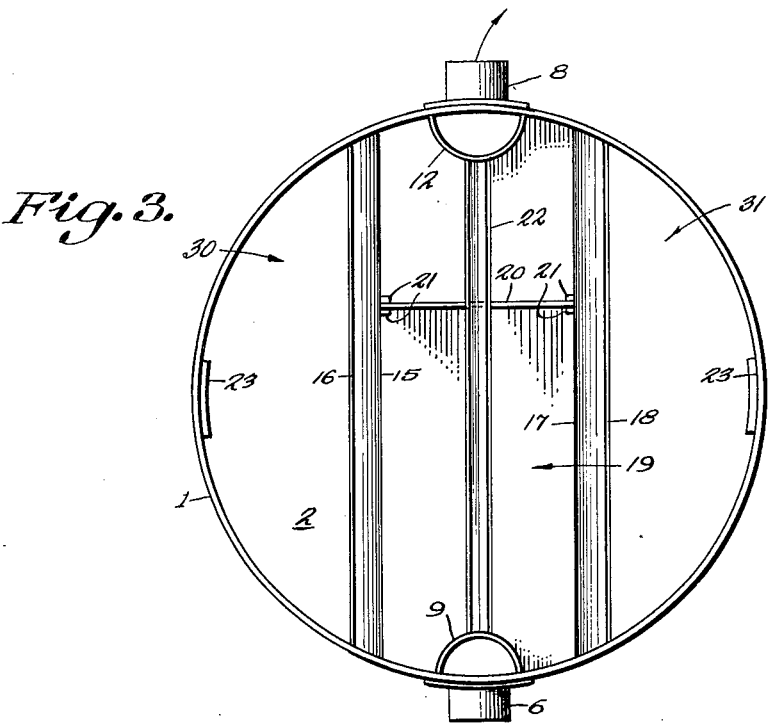
Figure 3 is a top plan view, the cover plate and sectional inner cover being removed.
Figure 4:
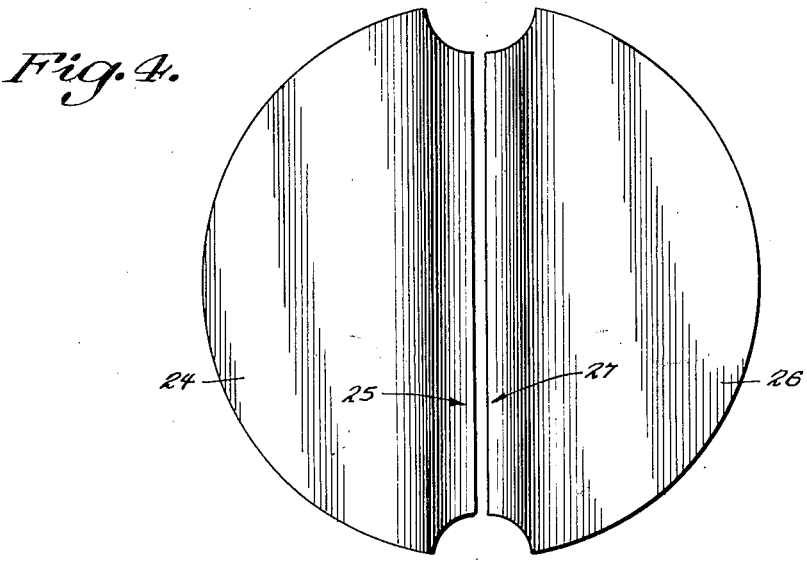
Figure 4 is a top plan view of said sectional inner cover.

Referring to the drawings in detail, the septic tank constituting the present invention is in the present instance, but not necessarily, of cylindrical shape, being formed with the cylindrical side wall 1 rigid with an upstanding from the circular flat bottom plate 2. The tank is embedded in the ground G, and at its upper end is formed open but is normally closed by a circular flat cover plate 3 provided with the peripheral depending flange 4.

Formed in the side wall 1 adjacent the upper end thereof is an inlet opening 5, and rigidly secured to the outer surface of the side wall in register with the opening is an inlet flange 6 to which is connected the inlet pipe in the usual manner, said inlet pipe not being shown.

An outlet opening 7 is located diametrically opposite the opening 5 and is disposed a slightly greater distance from the upper end of the side wall than is the inlet opening. An outlet flange 8 registering with the outlet opening and rigidly secured to the side wall 1 extends laterally from the side wall and is adapted for connection to the outlet pipe, not shown.

Material entering the tank through the inlet opening 5 moves downwardly through the inlet baffle 9 secured rigidly to the inner surface of the side wall and extending vertically of the side wall, the baffle being elongated and of half-round cross section. The lower or outlet end 10 of the inlet baffle is open and is spaced a substantial distance from the bottom plate 2, while the upper end 11 of the baffle extends above the inlet opening and is spaced a short distance from the cover plate 3 to provide a vent for air and gases.

Mounted rigidly upon the inner surface of the side wall and overlying the outlet opening 7 is the outlet baffle 12 also half-round and formed open at its lower or inlet end 13. However, the outlet baffle's lower end is not spaced as far from the bottom plate 2 as the inlet baffle. Further, the upper end 14 thereof is in full contact with the underside of the cover plate 3 so as to be fully closed thereby.

The purpose of the inlet baffle is to isolate the opening 5 from the passage or water chamber of the tank, while the outlet baffle has as its main purpose preventing sludge from reaching the outlet.

The space between the inlet and outlet baffles and extending through the center of the tank is a passage chamber normally filled with water W, the material on entering the tank being fed into said passage chamber, with the bacterial action whereby the material is converted into sludge S taking place within this chamber.

This chamber is defined at one side thereof by an upstanding partition 15 welded or otherwise rigidly secured to the side wall, said partition terminating a substantial distance from the cover plate and being formed at its upper end with a curved lip 16 over which the sludge is forced, to drop down into the sludge chambers respectively located at opposite sides of the passage chamber.

Another partition 17 is provided with a lip 18 and is spaced from the partition 15 to cooperate therewith in forming said passage chamber.

For the purpose of preventing the raw material fed through the inlet opening from passing directly along and across the lower portion of the passage chamber to the outlet opening, I provide a transverse baffle 20 extending across the lower end of the passage chamber and located closer to the outlet than to the inlet baffle. This baffle 20 is substantially higher than the lower end of the outlet baffle and thus serves to prevent the raw material from entering the outlet baffle. The baffle 20, it may be noted, is removably mounted in opposite pairs of guides 21 secured to the respective partitions 15 and 17.

Welded or otherwise rigidly secured at its opposite ends to the upper portions of the inlet and outlet baffles, and extending diametrically of the tank, is an angle 22 disposed a slight distance and located midway between the upper lips 16 and 18. Arcuate horizontally disposed supporting shoulders 23 are rigidly attached to the inner surface of the side wall at diametrically opposite points.

One of these shoulders supports the outer or arcuate edge of a top or horizontal baffle or inner cover section 24 formed to a semi-circular shape, the straight edge of the baffle 24 extending diametrically of the tank and being seated in the angle 22. This top baffle is spaced a short distance from the cover plate so as to define therebetween a gas chamber to which air and gases will escape from the lower portion of the tank through the small opening at the upper end of the inlet baffle 9.

Formed like the baffle 24 and having its arcuate edge supported upon the diametrically opposite shoulder 23 is the complementary inner cover section of baffle 26. The baffles 24 and 26 have their straight or inner edges curved downwardly, as at 25 and 27 respectively, for seating in the angle 22. Thus, means is provided that forms branch passage chambers 28 and 29 respectively at the upper end of the passage chamber 19, so as to cause the material, as it comes to the top of the water W, to divide and fall over the lips 16 and 18 into the opposite sludge chambers 30 and 31.

The operation of the septic tank has been touched upon hereinbefore, but it is believed advisable, for a full and complete understanding of the invention, to discuss said operation additionally, to trace the flow of material through the tank from inlet to outlet thereof.

Upon movement of the material through the inlet opening, the material moves downwardly within the inlet baffle and into the passage chamber, air and gases being vented to the air chamber above the inner cover in the meantime.

The passage chamber is filled with water to the top edges of the partitions, and bacterial action commences immediately, as a result of which the material acted on is floated to the top of the passage chamber and forms into sludge. The sludge mass so floated is divided continuously, whenever increased by the addition of more sludge, by the depressed diametrically extending center portion of the sectional cover, and is thus forced over the lips of the partitions, dropping to the bottoms of the two sludge chambers, which are free of water at all times.

It will be seen that by reason of this arrangement the need for constant pumping is effectually eliminated. This is by reason of provision of the spaced sludge chambers of substantial size, that receive sludge continuously, the sludge being deposited where it can not force the water level downwardly and eventually find its way into the drain system. The need for more or less frequent cleaning is reduced materially also, since the tank has so greatly increased a sludge capacity as to require cleaning only when the two sludge chambers fill, as distinguished from conventionally constructed septic tanks which require cleaning of the sludge from the container whenever the sludge mass covering the water becomes of dangerously large size.

I claim:

1. A septic tank including a container having diametrically opposite inlet and outlet openings, inlet and outlet baffles extending downwardly from said openings and opening at the lower portion of the container interior, upstanding partitions extending upwardly from the bottom of the container, said partitions terminating substantially short of the upper end of the container, the baffles opening into the space between the partitions, there being a liquid passage chamber defined between said partitions and a pair of side sludge chambers at opposite sides of said passage chamber for substantially liquid-free sludge, all of the chambers communicating in the space above the upper ends of the partitions, and an inner cover spaced from the upper end of the container and spaced above the upper ends of the partitions, the inner cover having a depressed center portion extending diametrically of the container above the passage chamber and constituting a sludge divider for dividing substantially liquid-free sludge formed at the upper end of the passage chamber into equal masses for deposit in the respective sludge chambers, the inlet baffle being in communication at its upper end with the space between the inner cover and the upper end of the container.

2. A septic tank including a container having a bottom wall and an upstanding partition extending from said wall and dividing the container into a passage chamber and a sludge chamber, said container having an inlet opening and an outlet opening, both opening into said passage chamber, downwardly-directed baffles in said passage chamber within said container and disposed at said openings, said partition having an outwardly-extending lip at its upper end extending over a portion of said sludge chamber, and means to direct sludge, rising in said passage chamber, to flow outwardly over said lip, including a baffle within said container and above said chambers and having an upwardly-curved portion above said lip and a downwardly-curved portion over said passage chamber.

3. A septic tank including a container having a bottom wall and inlet and outlet openings; downwardly-directed baffles at said openings and disposed within said container; upstanding partitions, having outwardly-extending lips at their upper ends, in said container and extending upwardly from said bottom wall and dividing the container into side sludge chambers and an intervening passage chamber communicating with said openings, said chambers being in communication at said lips; and means to cause sludge rising in said passage chamber, to divide and fall over said lips and drop by gravity into said sludge chambers.

4. A septic tank including a container having a bottom wall, an upper end and inlet and outlet openings; downwardly-directed baffles at said openings and disposed within said container; a pair of upstanding substantially fluid-tight partitions in said container, extending from said bottom wall and terminating short of the upper end of said container, said partitions having outwardly-extending lips at their upper ends, and said partitions dividing the interior of the container into a pair of sludge chambers and a passage chamber, said chambers communicating above said lips of the partitions and the passage chamber being in communication with the inlet and outlet openings; and means to cause sludge rising in said passage chamber, to divide and fall over said lips and drop by gravity into said sludge chambers.

5. A septic tank including a container having a bottom wall, side walls and inlet and outlet openings; downwardly-directed baffles in said container at said openings, a pair of partitions extending upwardly from the bottom wall of said container and from side wall to side wall of the container, said partitions terminating short of the upper end of the container to define side sludge chambers and an intervening passage chamber, said chambers being wholly separate from one another at the lower end and intermediate portions of the container and in full communication with one another above the upper ends of the partitions; and means to cause sludge, rising in said passage chamber, to divide and fall over said lips and drop by gravity into said sludge chambers.

6. A septic tank including a container having inlet and outlet openings, downwardly directed baffles within said container at said openings, a cover plate for the container, a baffle within said container, said baffle being spaced from the cover plate and having a depressed center portion extending approximately diametrically of the container and defining a sludge-parting edge; and upstanding partitions in said container below the inner cover and extending from the bottom of said container and dividing the container into side sludge chambers and an intervening passage chamber communicating with said openings, said chambers being in communication at their upper ends, said depressed center portion being located above the center part of the passage chamber to divide sludge issuing from the passage chamber and direct said sludge into the respective sludge chambers.

7. A septic tank including a container having inlet and outlet openings; downwardly-directed baffles at said openings; a cover plate for said container; a sectional baffle mounted in the container below the cover plate and comprising a pair of sections having down-curved meeting edges to provide a depressed sludge divider extending diametrically of the container; partitions upstanding from the bottom of the container and defining upper edges and side sludge compartments and a passage compartment disposed diametrically of the container interior and communicating with the inlet and outlet openings at opposite sides, said partitions terminating substantially short of the baffle to provide communicating spaces between the sludge and passage chambers at the upper ends of said chambers, said divider forming sludge, arising in the passage chamber, into substantially equal masses for movement over said edges and dropping into the respective sludge chambers; and means for venting the inlet opening to said air chamber, all of said baffles being within said container.

8. A septic tank including a container having a bottom wall and inlet and outlet openings; downwardly-directed baffles at said openings; a pair of partitions upstanding from the bottom wall of said container and dividing the container interior into a pair of side sludge chambers and a passage chamber communicating with said openings and intervening between the sludge chambers, said chambers being in full communication at their upper ends; inlet and outlet baffles overlying the respective openings and extending downwardly along opposite sides of the passage chamber and communicating with the lower end of the passage chamber; a substantially transversely V-shaped cross bar mounted within the container and extending between the baffles with its apex pointing downwardly, and a pair of inner cover sections within the container, providing a baffle, having downwardly-extending meeting edges seated on said cross bar, said sections and said cross bar constituting a divider for dividing sludge issuing from the upper end of the passage chamber into substantially equal masses to deposit in the respective sludge chambers.

MICHAEL D'ALIBERTI.

REFERENCES CITED

The following references are of record in the file of this patent:

UNITED STATES PATENTS

| Number | Name | Date |
|---|---|---|
| 702,811 | McCoy et al. | June 17, 1902 |
| 1,602,052 | Smith | Oct. 5, 1926 |
| 1,708,118 | Carpenter et al. | Apr. 9, 1929 |
| 1,952,211 | Loeb | Mar. 27, 1934 |
| 2,171,853 | Kurtzbein | Sept. 5, 1939 |

OTHER REFERENCES

Keefer, Sewage Treatment Works, published by McGraw-Hill Book Co., New York, N. Y. 1940, page 179 cited.